United States Patent
Muraishi

[11] Patent Number: 5,859,441
[45] Date of Patent: Jan. 12, 1999

[54] SCANNING DEVICE

[75] Inventor: Katsuaki Muraishi, Kanagawa-ken, Japan

[73] Assignee: Fuji Photo Film Co., Ltd., Kanagawa-ken, Japan

[21] Appl. No.: 794,904

[22] Filed: Feb. 4, 1997

[30] Foreign Application Priority Data

May 2, 1996 [JP] Japan ................................ 8-018688

[51] Int. Cl.$^6$ ............................. G03B 42/02; H04N 1/04
[52] U.S. Cl. ......................... 250/584; 250/236; 250/589
[58] Field of Search ................................ 250/584, 585, 250/589, 234, 235, 236

[56] References Cited

U.S. PATENT DOCUMENTS

| | | | |
|---|---|---|---|
| 4,417,260 | 11/1983 | Kawai et al. | 250/589 X |
| 4,582,989 | 4/1986 | Agano | 250/585 |
| 4,816,923 | 3/1989 | Saotome | 250/584 X |
| 4,945,238 | 7/1990 | Muraishi | 250/589 |
| 4,973,134 | 11/1990 | Finkenzeller et al. | 250/584 |
| 5,025,157 | 6/1991 | Katsuaki | 250/589 |

*Primary Examiner*—Edward J. Glick
*Attorney, Agent, or Firm*—Sughrue, Mion, Zinn, Macpeak & Seas, PLLC

[57] ABSTRACT

A scanning device includes sheet a holding member provided with an arcuate support surface open to the upside and one side for holding a sheet to be scanned on the back surface of which a magnetic layer is formed, a light source for irradiating the sheet to be scanned with light, a spinner including a deflection mirror for deflecting light from the light source toward the sheet to be scanned and a converging optical system for converging light deflected by the deflection mirror onto a surface of the sheet to be scanned, a motor for rotating the spinner coaxially with a center axis of the arcuate support surface, a light detector for detecting light from the sheet to be scanned, a sub-scanning motor for translating the sheet holding member relative to the spinner in parallel with the center axis, magnetic material provided on the arcuate support surface of the sheet holding member, sheet end portion holding members provided at one end portion of the arcuate support surface of the sheet holding member and adapted for abutting against one end portion of the sheet to be scanned to hold the one end portion at a predetermined position, and sheet pressing members provided at the other end portion of the arcuate support surface of the sheet holding member and adapted for abutting against the other end portion of the sheet to be scanned to press the sheet to be scanned along the arcuate support surface toward the sheet end portion holding members. According to the thus constituted scanning device, it is possible to hold a sheet to be scanned in close contact with a predetermined position of the arcuate support surface of a sheet holding means with a simple structure.

20 Claims, 8 Drawing Sheets

SCANNING DEVICE

BACKGROUND OF THE INVENTION

The present invention relates to a scanning device and, particularly, to such a device suitable for scanning stimulable phosphor storing the energy of light, radiation or an electron beam with an electromagnetic wave to excite the stimulable phosphor, thereby releasing the energy of light, radiation or an electron beam in the form of light, and reading an image of light, radiation or an electron beam stored in the stimulable phosphor by photoelectrically detecting released light.

DESCRIPTION OF THE PRIOR ART

Methods or systems for recording and reproducing an image of light, radiation or an electron beam using a stimulable phosphor sheet formed with a stimulable phosphor layer containing a stimulable phosphor which stores the energy of light, radiation or an electron beam upon being irradiated therewith and then releases light whose amount is proportional to the stored energy upon being irradiated with an electromagnetic wave are widely known, the method including steps of recording an image of light, radiation or an electron beam in the stimulable phosphor, scanning the stimulable phosphor with an electromagnetic wave to release the energy of light, and reading an image of light, radiation or an electron beam in the form of light, photoelectrically detecting the released light to produce image data, and reproducing the image on a display means such as a CRT or a photographic film based on the produced image data.

For example, Japanese Patent Application Laid Open No. 55-12429, Japanese Patent Application Laid Open No. 55-12145 and the like propose a method including the steps of storing the energy of radiation transmitted through an object in the stimulable phosphor layer provided on the stimulable phosphor sheet, then scanning the stimulable phosphor layer with an electromagnetic wave to stimulate it, photoelectrically detecting stimulated emission released from the stimulable phosphor layer, producing digital image signals, effecting predetermined signal processing thereon and reproducing an image on a display means such as a CRT or a photographic film. This method is widely used in the field of radiographic diagnosis.

Further, Japanese Patent Publication No. 1-60784, Japanese Patent Publication No. 1-60782, Japanese Patent Publication No. 4-3952 and the like propose an autoradiographic detection method including the steps of introducing a radioactively labeled substance into an organism, using the organism or a part of the tissue of the organism as a specimen, placing the specimen and the stimulable phosphor layer provided on the stimulable phosphor sheet together in layers for a certain period of time to cause the stimulable phosphor to absorb the radiation energy, then scanning the stimulable phosphor layer with an electromagnetic wave to excite the stimulable phosphor, photoelectrically detecting stimulated emission released from the stimulable phosphor to produce digital image signals, effecting predetermined signal processing thereon, reproducing an image on a display means such as a CRT or a photographic film and obtaining locational information regarding the radioactively labeled substance. Furthermore, Japanese Patent Application Laid Open No. 3-205550, Japanese Patent Application Laid Open No. 4-232864 and the like propose a chemiluminescent detection method including the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, storing the energy of the chemiluminescent emission in the wavelength of visible light generated by the contact of the chemiluminescent substance and the labeling substance in the stimulable phosphor contained in the stimulable phosphor layer provided on the stimulable phosphor sheet, then scanning the stimulable phosphor layer with an electromagnetic wave to excite the stimulable phosphor, photoelectrically detecting stimulated emission released from the stimulable phosphor to produce digital image signals, effecting predetermined signal processing thereon, reproducing an image on a display means such as a CRT or photographic film and obtaining information relating to the high molecular substance such as genetic information. Moreover, Japanese Patent Application Laid Open Nos. 61-51738 , 61-93538 and the like propose a detection method using an electron microscope including the steps of irradiating a metal or nonmetal specimen with an electron beam, storing the energy of the electron beam diffracted by or transmitted through the specimen in the stimulable phosphor contained in the stimulable phosphor layer provided on the stimulable phosphor sheet, then scanning the stimulable phosphor layer with an electromagnetic wave to excite the stimulable phosphor, photoelectrically detecting stimulated emission released from the stimulable phosphor to produce digital image signals, effecting predetermined signal processing thereon, reproducing an image on a display means such as a CRT or photographic film and effecting elemental analysis, composition analysis or structural analysis of the specimen, or observing the tissue of an organism. Further, Japanese Patent Application Laid Open No. 59-15843 and the like propose a radiographic diffraction image detecting method including the steps of irradiating a specimen with radiation, storing the energy of radiation diffracted by the specimen in the stimulable phosphor, then scanning the stimulable phosphor with an electromagnetic wave to stimulate it, photoelectrically detecting stimulated emission released from the stimulable phosphor to produce digital image signals, effecting predetermined signal processing thereon, reproducing an image on a display means such as a CRT or photographic film and effecting structural analysis of the specimen.

In any of these methods, it is indispensable to scan stimulable phosphor contained in the stimulable phosphor layer provided on the stimulable phosphor sheet with an electromagnetic wave to excite the stimulable phosphor, cause the stimulable phosphor to release the stored energy of light, radiation or the electron beam in the form of stimulated emission and photoelectrically detect the stimulated emission, and scanning devices for these methods have been proposed.

Japanese Patent Application Laid Open No. 64-32761 discloses a scanning device which can be used for reading such an image. This scanning device includes sheet holding means for arcuately holding a stimulable phosphor sheet having a stimulable phosphor layer containing a stimulable phosphor, a stimulating light source for emitting light for exciting the stimulable phosphor, a half mirror provided in the light path of the stimulating light for transmitting and/or reflecting the incident stimulating light, a deflection mirror for reflecting the stimulating light transmitted through the half mirror toward the stimulable phosphor sheet on the center axis of the arcuate surface of the sheet holding means, a condenser lens for converging the stimulating light reflected by the deflection mirror, a spinner for rotating the deflecting mirror and the condenser lens coaxially with the center axis to scan the stimulable phosphor sheet with the stimulating light in the primary scanning direction, sub-scanning means for moving the sheet holding means with respect to the spinner in the direction parallel to the center axis of the arc formed by the stimulable phosphor sheet, a detection lens for converging the stimulated emission released from the stimulable phosphor sheet and transmitted through the condenser lens and the half mirror, an aperture disposed at a position of the stimulated emission focused by the detection lens and having a size sufficient for transmitting only the focused stimulated emission, and a light detector provided behind the aperture.

This scanning device is constituted so as to move the sheet holding means which holds the stimulable phosphor sheet in a concave manner on the arcuate support surface open to the upside and one side in the vicinity of the rotating spinner in the sub-scanning direction parallel to the center axis of the arcuate support surface of the sheet holding means, scan the stimulable phosphor sheet held by the sheet holding means with the stimulating light from the spinner, photoelectrically detect stimulated emission released from the stimulable phosphor layer of the stimulable phosphor sheet and read an image.

Accordingly, it is necessary to closely contact the stimulable phosphor sheet at a predetermined position of the arcuate support surface of the sheet holding means open to the upside and one side and hold it for scanning the stimulable phosphor sheet with the stimulating light in a desired manner while the sheet holding means is being moved and the stimulable phosphor sheet is being scanned with the stimulating light from the spinner. For this purpose, in conventional scanning devices, the arcuate support surface of the sheet holding means is formed with apertures communicating with a suction means such as a vacuum pump and the suction means is actuated to suck the stimulable phosphor sheet onto the arcuate support surface at a predetermined position and hold it while the sheet holding means is being moved in a sub-scanning direction.

However, the suction means itself is costly and its running cost is high. Further, in the case where the suction means is provided integrally with the sheet holding means, it is necessary to move a big and heavy means. On the other hand, in the case where the suction means is provided separately from the sheet holding means so that only the sheet holding means need be moved, it is necessary to connect the suction means and the sheet holding means with a flexible pipe or the like so that only the sheet holding means can be moved in the sub-scanning direction and the mechanism of the scanning device becomes complicated.

The same problems occur in the case where a sheet recorded with image information is scanned with light to read an image.

SUMMARY OF THE INVENTION

It is therefore an object of the present invention to provide a scanning device which can hold a sheet to be scanned in close contact with a predetermined position of the arcuate support surface of a sheet holding means with a simple structure.

The above and other objects of the present invention can be accomplished by a scanning device comprising sheet holding means provided with an arcuate support surface open to the upside and one side for holding a sheet to be scanned on the back surface of which a magnetic layer is formed, a light source for irradiating the sheet to be scanned with light, a spinner including a deflection mirror for deflecting light from the light source toward the sheet to be scanned and a light converging means for converging light deflected by the deflection mirror onto a surface of the sheet to be scanned, a motor for rotating the spinner coaxially with a center axis of the arcuate support surface, a light detector for detecting light from the sheet to be scanned, sub-scanning means for translating the sheet holding means relative to the spinner in parallel with the center axis, magnetic material provided on the arcuate support surface of the sheet holding means, sheet end portion holding means provided at one end portion of the arcuate support surface of the sheet holding means and adapted for abutting against one end portion of the sheet to be scanned to hold the one end portion at a predetermined position, and sheet pressing means provided at the other end portion of the arcuate support surface of the sheet holding means and adapted for abutting against the other end portion of the sheet to be scanned to press the sheet to be scanned along the arcuate support surface toward the sheet end portion holding means.

In a preferred aspect of the present invention, the sheet end portion holding means is provided at a lower end portion of the arcuate support surface of the sheet holding means and the sheet pressing means is provided at an upper end portion of the arcuate support surface of the sheet holding means.

The above and other objects and features of the present invention will become apparent from the following description made with reference to the accompanying drawings.

DESCRIPTION OF THE PREFERRED EMBODIMENTS

Figure 1:
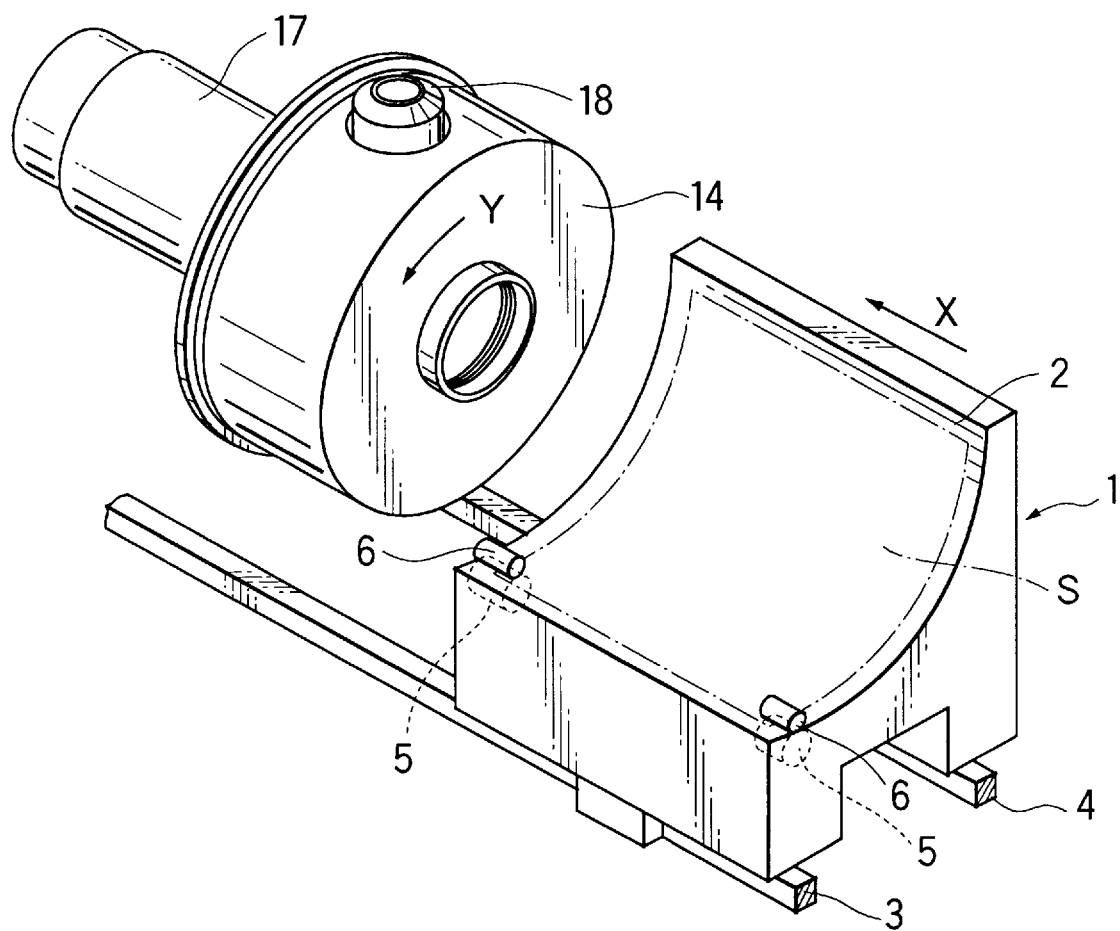
FIG. 1 is schematic perspective view showing a sheet holding means and a spinner of a scanning device which is an embodiment of the present invention.

FIG. 1 is a schematic perspective view showing a sheet holding means for holding a stimulable phosphor sheet and a spinner which are used in an autoradiographic image reading apparatus which is a scanning device according to an embodiment of the present invention and a spinner. The autoradiographic image reading apparatus scans a stimulable phosphor sheet formed with a stimulable phosphor layer containing a stimulable phosphor in which locational information regarding a radioactively labeled substance is recorded with a laser beam to excite the stimulable phosphor and photoelectrically detects light emitted from the stimulable phosphor to produce digital image signals.

The sheet holding means 1 is adapted to arcuately hold the stimulable phosphor sheet S on the back surface of which a magnetic layer is formed. The stimulable phosphor sheet S is provided with the stimulable phosphor layer containing a stimulable phosphor and image information is stored in the form of radiation energy in the stimulable phosphor layer.

The sheet holding means 1 has a concave arcuate support surface 2 open to the upside and one side and as indicated by an imaginary line in FIG. 1, the stimulable phosphor sheet S can be arcuately held on the arcuate support surface 2. The sheet holding means 1 can be moved by a motor (not shown) along guide rails 3, 4 in the direction indicated by an arrow X in FIG. 1. A lower end portion of the arcuate support surface 2 of the sheet holding means 1 is provided with driven rollers 5 and drive rollers 6 capable of holding the stimulable phosphor sheet S therebetween and transporting it. The stimulable phosphor sheet S held between the driven rollers 5 and the drive rollers 6 can be located at a predetermined position on the arcuate support surface 2 along the arcuate support surface 2 of the sheet holding means 1 by rotating the rollers 5, 6 and the stimulable phosphor sheet S held on the arcuate support surface 2 of the sheet holding means 1 can be removed from the sheet holding means 1 by reversely rotating the rollers 5, 6.

Figure 2:
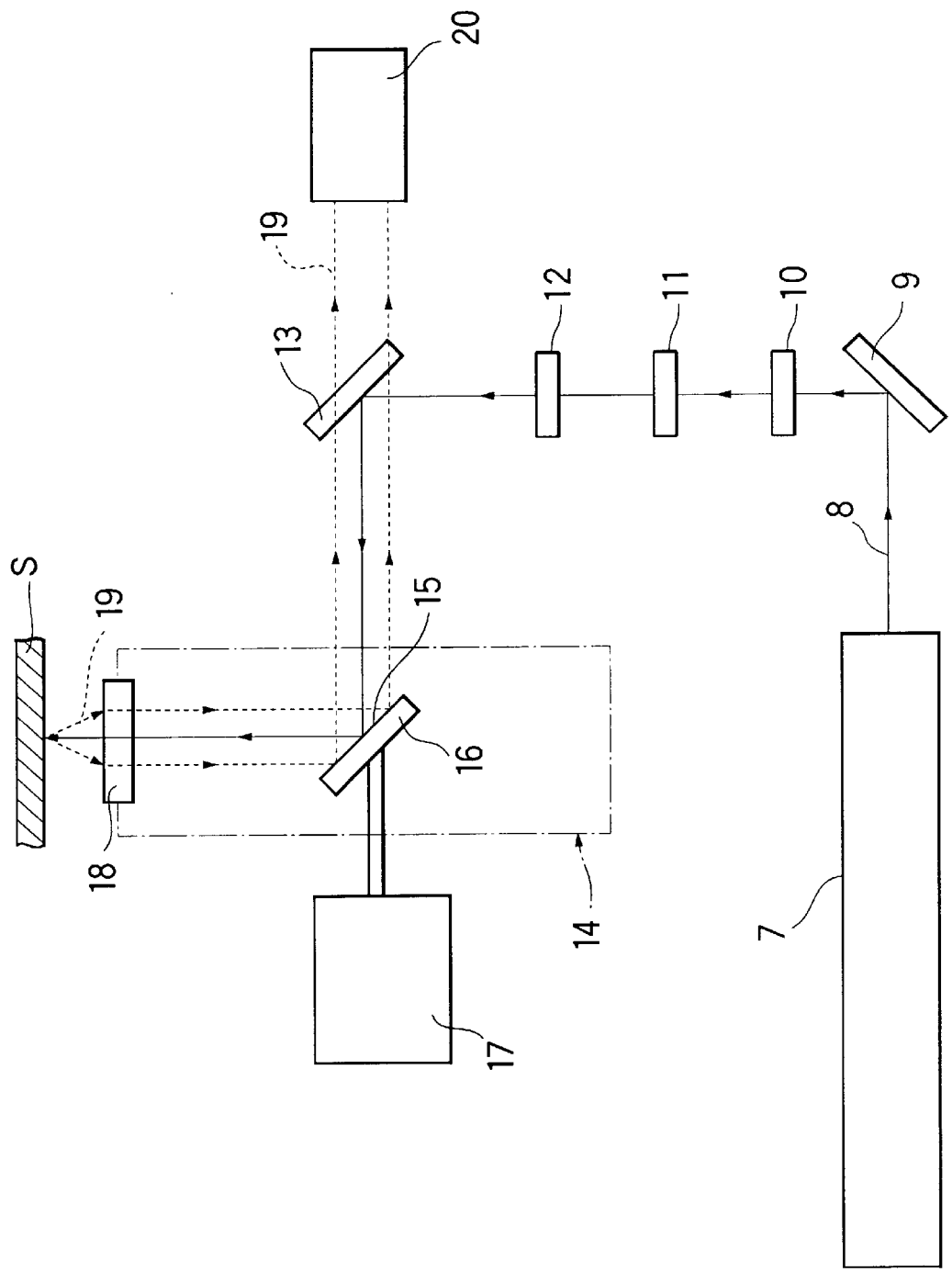
FIG. 2 is a schematic view showing a scanning optical system of a scanning device which is an embodiment of the present invention.
Figure 3:
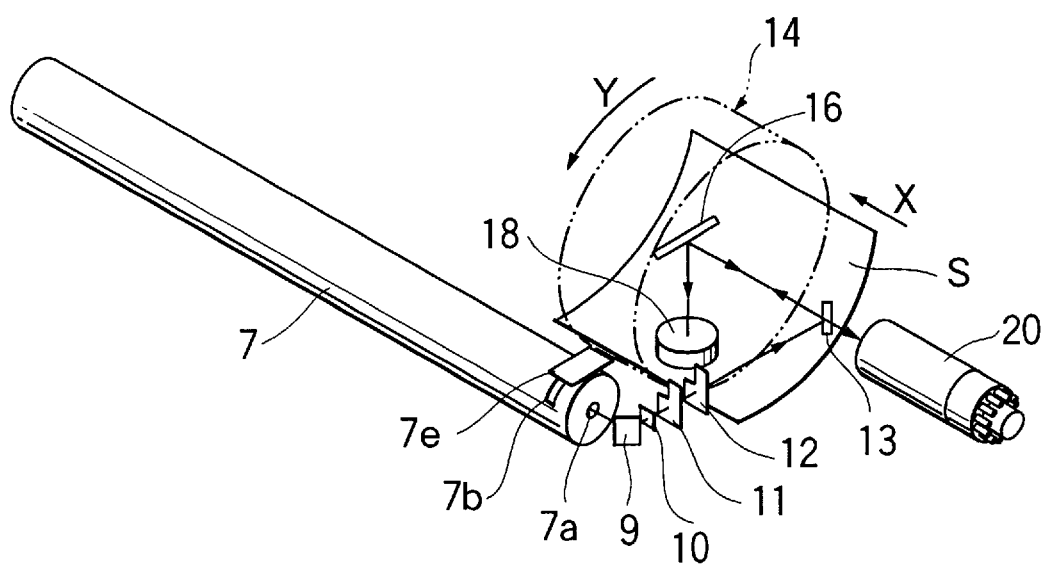
FIG. 3 is a schematic perspective view showing a scanning optical system of a scanning device which is an embodiment of the present invention.

FIG. 2 is a schematic view showing a scanning optical system of a scanning device which is an embodiment of the present invention and FIG. 3 is a schematic perspective view thereof.

The scanning device in this embodiment excites the stimulable phosphor contained in the stimulable phosphor layer of the stimulable phosphor sheet S with a laser beam and photoelectrically detects radiation energy released from the stimulable phosphor sheet S in the form of light.

As shown in FIGS. 2 and 3, the scanning device includes a laser beam source 7. The laser beam 8 emitted from the laser beam source 7 is deflected by a mirror 9 so that the light path thereof is deflected and passes through a filter 10 to cut off light of unnecessary wavelength. The laser beam 8 further passes through a first shutter 11 and a second shutter 12. After passing through the first shutter 11 and the second shutter 12, the laser beam 8 enters a dichroic mirror 13 disposed on the center axis of the arcuate support surface 2. The dichroic mirror 13 allows light of the wavelength region of the stimulated emission released from the stimulable phosphor sheet S to pass through but reflects light of the wavelength region of the laser beam 8.

The laser beam 8 reflected by the dichroic mirror 13 enters a cylindrical spinner 14 disposed on the center axis of the arcuate support surface 2. The spinner 14 is constituted so that a spindle motor 17 continuously rotates a deflection mirror 16 formed with a reflecting surface 15 at 45 degrees with the incident laser beam 8 at a high speed, for example, 2000 rpm, in the direction indicated by an arrow Y in FIG. 1. The deflection mirror 16 is disposed so as to reflect the laser beam 8 on the center axis of the arcuate support surface 2 of the sheet holding means 1 and the light path length of the laser beam 8 between a position where the laser beam 8 is reflected by the deflection mirror 16 and the surface of the stimulable phosphor sheet S held on the arcuate support surface 2 is kept constant.

A condenser lens unit 18 is provided in the light path of the laser beam 8 reflected by the deflection mirror 16 for converging the incident laser beam 8 as parallel light onto a desired spot on the surface of the stimulable phosphor sheet S held on the arcuate support surface 2. In this embodiment, the distance from the condenser lens unit 18 to the surface of the stimulable phosphor sheet S held on the arcuate support surface 2 is determined to be equal to the focal length f of the condenser lens unit 18. By using such a condenser lens unit 18, since the condenser lens unit 18 can be disposed at a position close to the stimulable phosphor sheet S without increasing the diameter of the condenser lens unit 18, it is possible to converge the laser beam using a condenser lens unit 18 whose focal length f is short onto an extremely small spot and excite the stimulable phosphor of the stimulable phosphor sheet S. The condenser lens unit 18 is continuously rotated together with the deflection mirror 16 by the spindle motor 17 at a high speed, for example, 2000 rpm, in the direction indicated by the arrow Y in FIG. 1.

As the spinner 14 is rotated at a high speed, the surface of the stimulable phosphor sheet S held on the arcuate support surface 2 is scanned in the primary scanning direction with the laser beam 8 in the direction indicated by the arrow Y in FIG. 1 and the surface of the stimulable phosphor sheet S is scanned with the laser beam 8 in the sub-scanning direction by moving the sheet holding means 1 in the direction indicated by the arrow X in FIGS. 1 and 3, whereby the surface of the stimulable phosphor sheet S is two-dimensionally scanned with the laser beam 8.

The stimulable phosphor contained in the stimulable phosphor layer provided on the stimulable phosphor sheet S is stimulated upon being irradiated with the laser beam 8 and releases the stored radiation energy in the form of stimulated emission 19 whose amount corresponds to the magnitude of the radiation energy. Although the stimulated emission 19 is emitted randomly from the position irradiated with the laser beam 8, it passes through the condenser lens unit 18 disposed at a position apart from the surface of the stimulable phosphor sheet S by the focal length f of the condenser lens unit 18 to become parallel light. After being reflected by the deflection mirror 16 of the spinner 14, the stimulated emission impinges on the dichroic mirror 13. Since the dichroic mirror 13 reflects light of the wavelength region of the laser beam 8 but allows light of the wavelength region of the stimulated emission released from the stimulable phosphor sheet S to pass through, the stimulated emission 19 passes through the dichroic mirror 13 and enters a photomultiplier 20 to be photoelectrically detected.

As shown in FIG. 3, in the vicinity of an emitting opening 7a of the laser beam source 7, a slot 7b is provided for operating a shutter (not shown) for opening and closing the emitting opening 7a. The laser beam 8 leaking through the slot 7b is detected by the photomultiplier 20 and low level signal noise is produced. Therefore, in the scanning device in this embodiment, a shielding plate 7e is provided so as to cover the slot 7b of the laser beam source 7, thereby eliminating the low level signal noise caused by detection of the laser beam 8 which leaks through the slot 7b by the photomultiplier 20.

Figure 4:
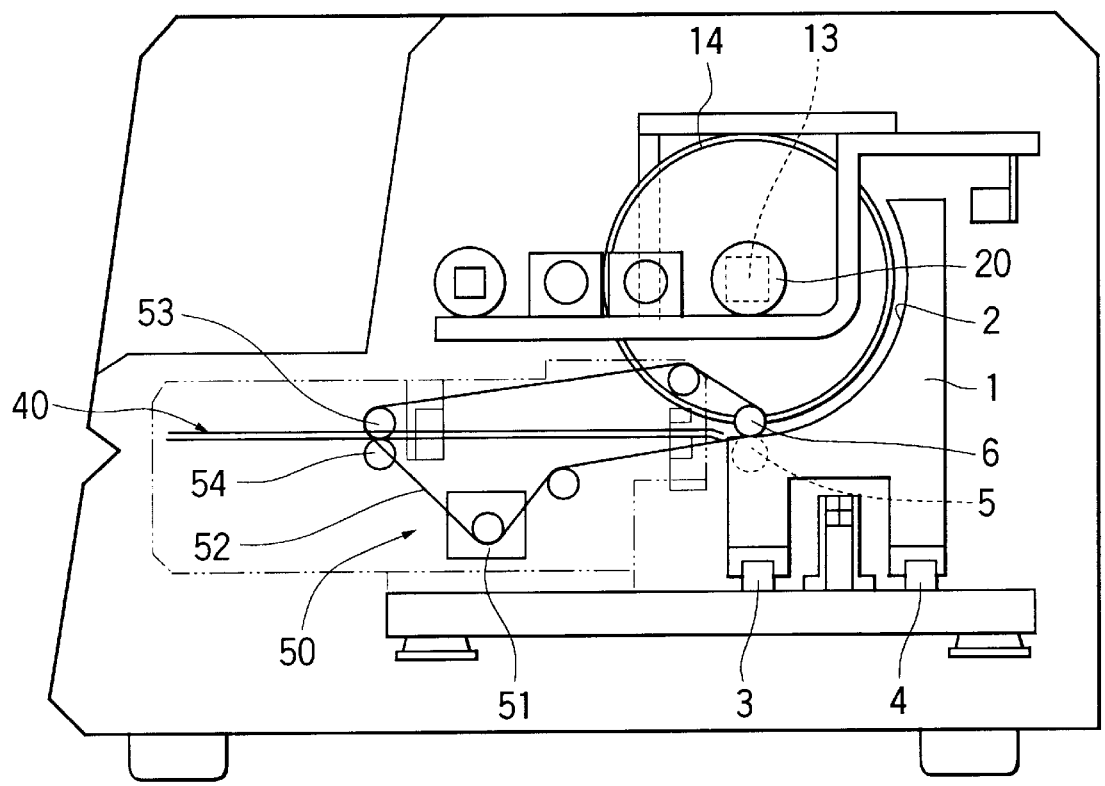
FIG. 4 is a schematic front view showing the positional relationship between a sheet holding means and a sheet placement portion of a scanning device which is an embodiment of the present invention.

FIG. 4 is a schematic front view showing the sheet holding means, a sheet placement portion and a sheet loading means of the scanning device which is an embodiment of the present invention.

As shown in FIG. 4, a sheet placement portion 40 is provided on the side of the sheet holding means 1 for placing stimulable phosphor sheets S to be held on the arcuate support surface 2 of the sheet holding means 1. Between the sheet holding means 1 and the sheet placement portion 40, a sheet loading means 50 is provided for feeding out the stimulable phosphor sheet S placed in the sheet placement portion 40 toward the sheet holding means 1 and transporting the stimulable phosphor sheet S along the arcuate support surface 2 to locate it at a predetermined position. The sheet loading means 50 is provided independently of the sheet holding means 1 to be moved in the sub-scanning direction and is provided with a drive motor 51, drive rollers 53 driven by the drive motor 51 via drive belts 52, and driven rollers 54 each forming a pair with one of the drive rollers 53. The driven rollers 5 each forming a pair with one of the drive rollers 6 are embedded in the lower end portion of the arcuate support surface 2 along the lower edge of the arcuate support surface 2 of the sheet holding means 1.

Each of the drive rollers 6 and each of the drive rollers 53 is movable by moving means (not shown) between a transport position where it can hold the stimulable phosphor sheet S between itself and the corresponding driven roller 5 or 54 and a retract position where it is retracted from the corresponding driven roller 5 or 54. FIG. 4 shows the drive rollers 6 and drive rollers 53 at their retracted positions. When the stimulable phosphor sheet S placed in the sheet placement portion 40 is to be loaded onto the arcuate support surface 2 of the sheet holding means 1, the sheet loading means 50 is operated as follows. The moving means is actuated to move the drive rollers 6 and the drive rollers 53 to their transport positions, thereby holding the stimulable phosphor sheet S between the drive rollers 53 and the driven rollers 54. The drive motor 51 is then driven to rotate the drive rollers 6 and the drive rollers 53 via the drive belts 52 and the stimulable phosphor sheet S placed in the sheet placement portion 40 is transported by the drive rollers 53 and the driven rollers 54 toward the sheet holding means 1. The stimulable phosphor sheet S is then held by the drive rollers 6 and the driven rollers 5 and is located at a predetermined position on the arcuate support surface 2 of the sheet holding means 1 by rotating the drive rollers 6 to be held by the sheet holding means 1.

Figure 5:
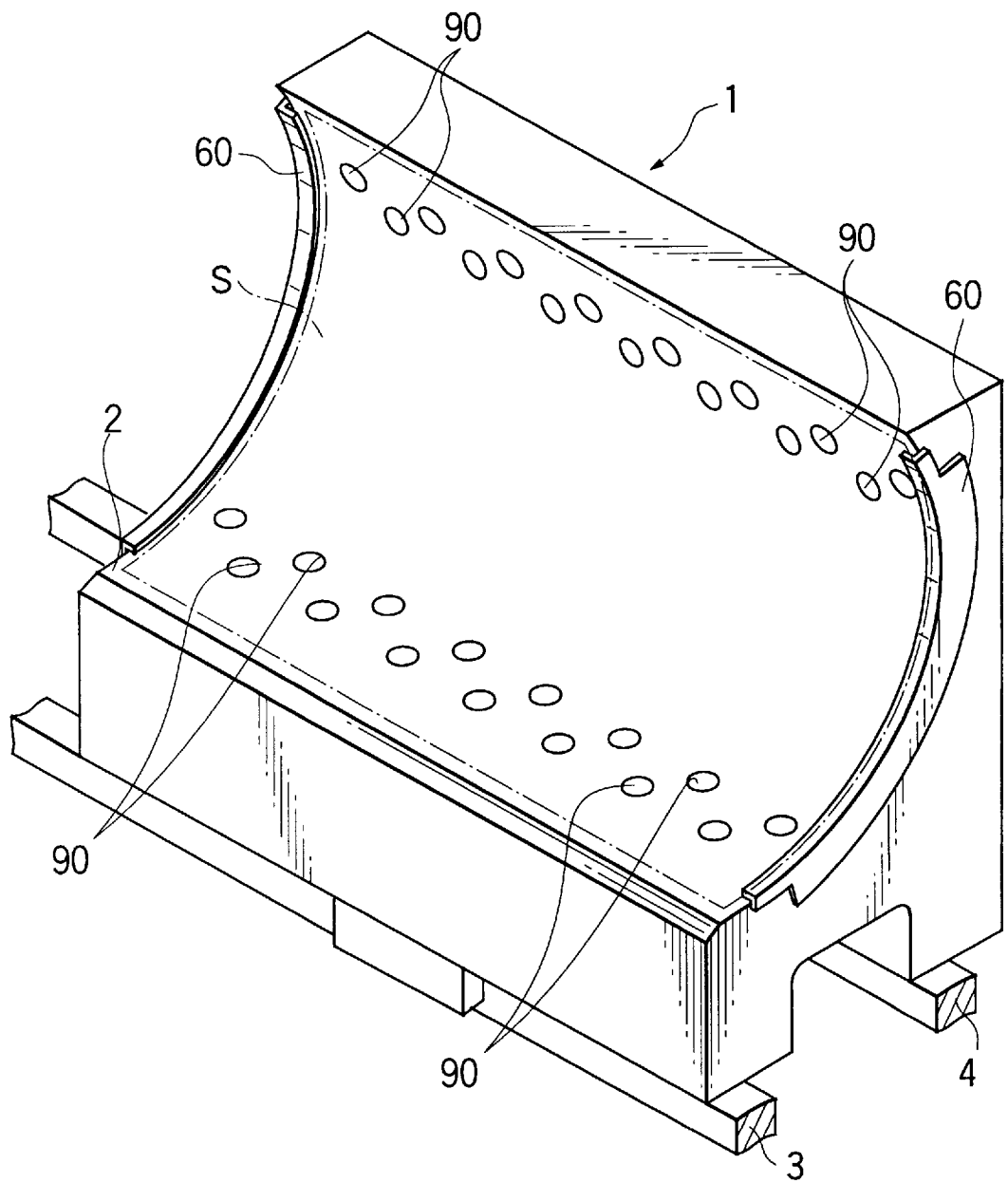
FIG. 5 is a schematic perspective view showing a sheet holding means of a scanning device which is an embodiment of the present invention.

FIG. 5 is a schematic perspective view showing the sheet holding means of the scanning device which is an embodiment of the present invention.

As shown in FIG. 5, a plurality magnets 90 are embedded in a zigzag pattern in parallel with the axis of the arcuate support surface 2 in the vicinity of the upper end portion and the lower end portion of the arcuate support surface 2 of the sheet holding means 1. Each magnet 90 is embedded in the arcuate support surface 2 in such a manner that the upper surface thereof is flush with or lower than the surface of the arcuate support surface 2 and does not interfere with the stimulable phosphor sheet S supported on the arcuate support surface 2.

It is preferable that the magnets 90 be provided so that when the stimulable phosphor sheet S is held at a predetermined position on the arcuate support surface 2, they are located inside of the upper edge portion and the lower edge portion of the stimulable phosphor sheet S by 5 to 25% of the length of the stimulable phosphor sheet S measured along the arc of the arcuate support surface 2, since this makes it possible to prevent the leading end portion and the rear end portion of the stimulable phosphor sheet S from peeling off the arcuate support surface 2 of the sheet holding means 1 and to closely contact the stimulable phosphor sheet S as a whole with the arcuate support surface 2 of the sheet holding means 1. Further, as shown in FIG. 5, sheet guides 60 each having an L-shaped cross section are provided at opposite side portions in the sub-scanning direction for guiding the opposite side edge portions of the stimulable phosphor sheet S when the stimulable phosphor sheet S is loaded onto the sheet holding means 1 by the sheet loading means 50 in such a manner that the stimulable phosphor sheet S can be reliably loaded at a predetermined position on the arcuate support surface 2 to lie along the arcuate support surface 2.

Figure 6:
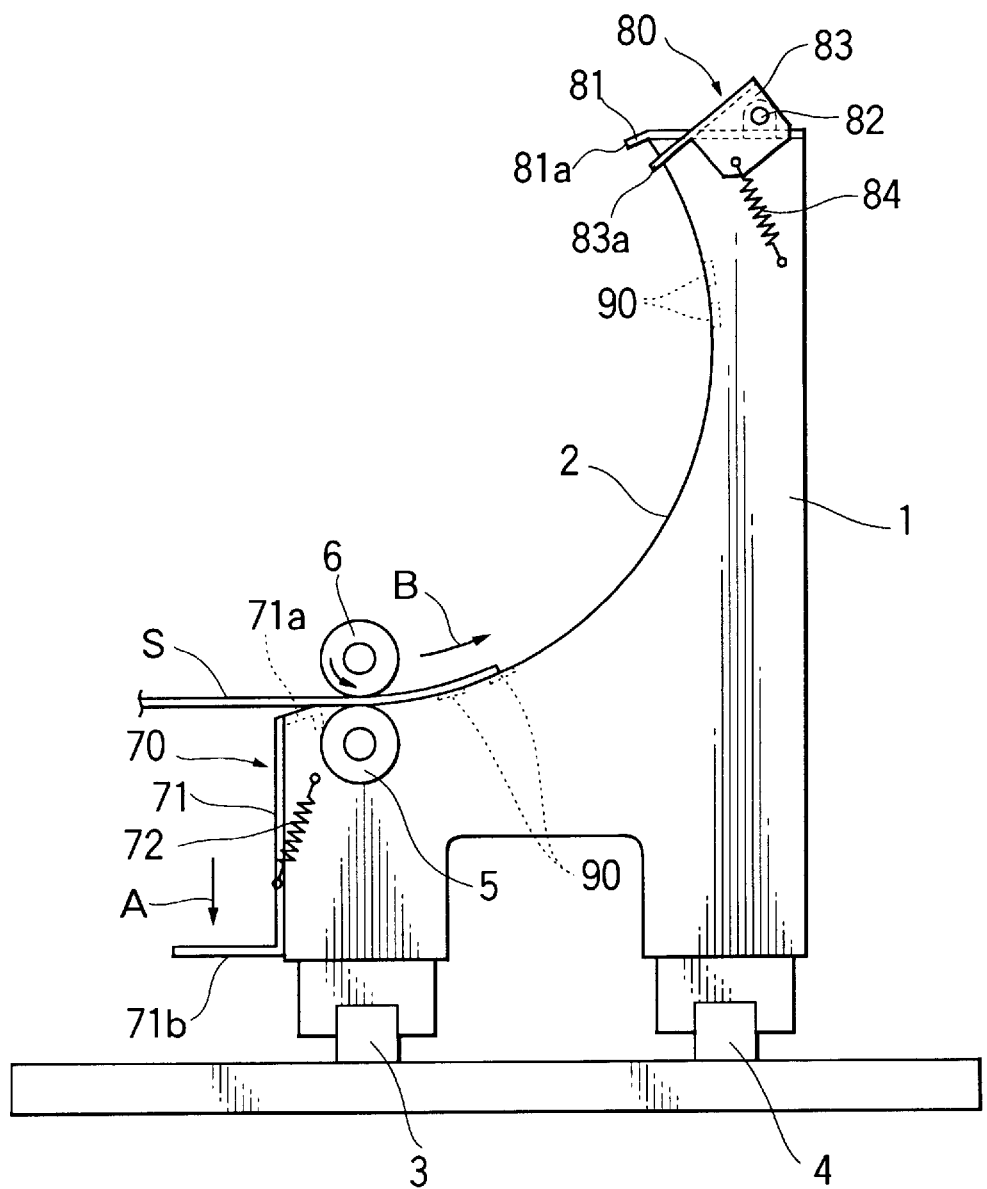
FIG. 6 is a schematic side view showing a sheet holding means at the time of setting a stimulable phosphor sheet onto an arcuate support surface of the sheet holding means of a scanning device which is an embodiment of the present invention.
Figure 7:
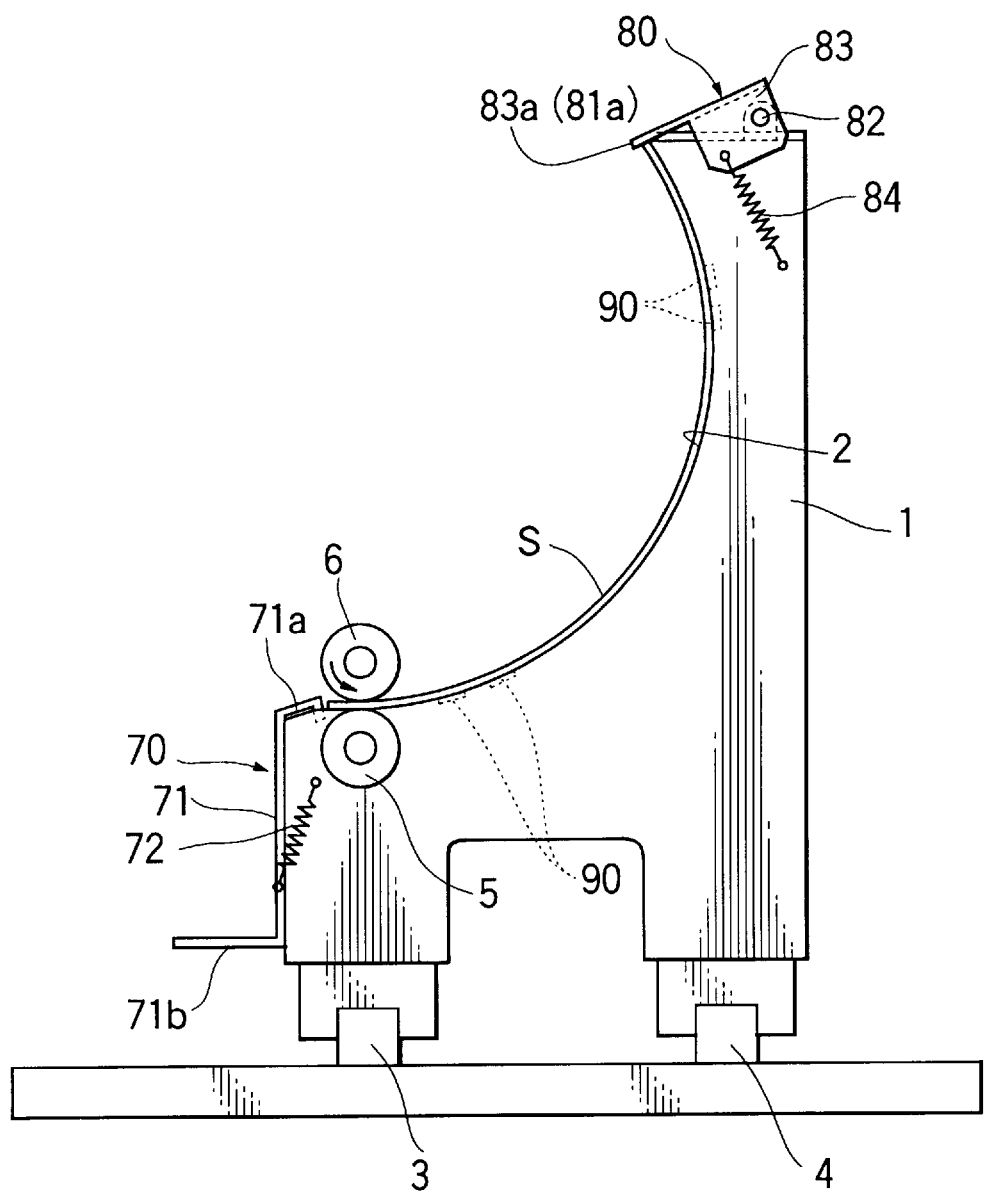
FIG. 7. is a schematic side view showing a sheet holding means at the time of setting a stimulable phosphor sheet onto an arcuate support surface of the sheet holding means of a scanning device which is an embodiment of the present invention.
Figure 8:
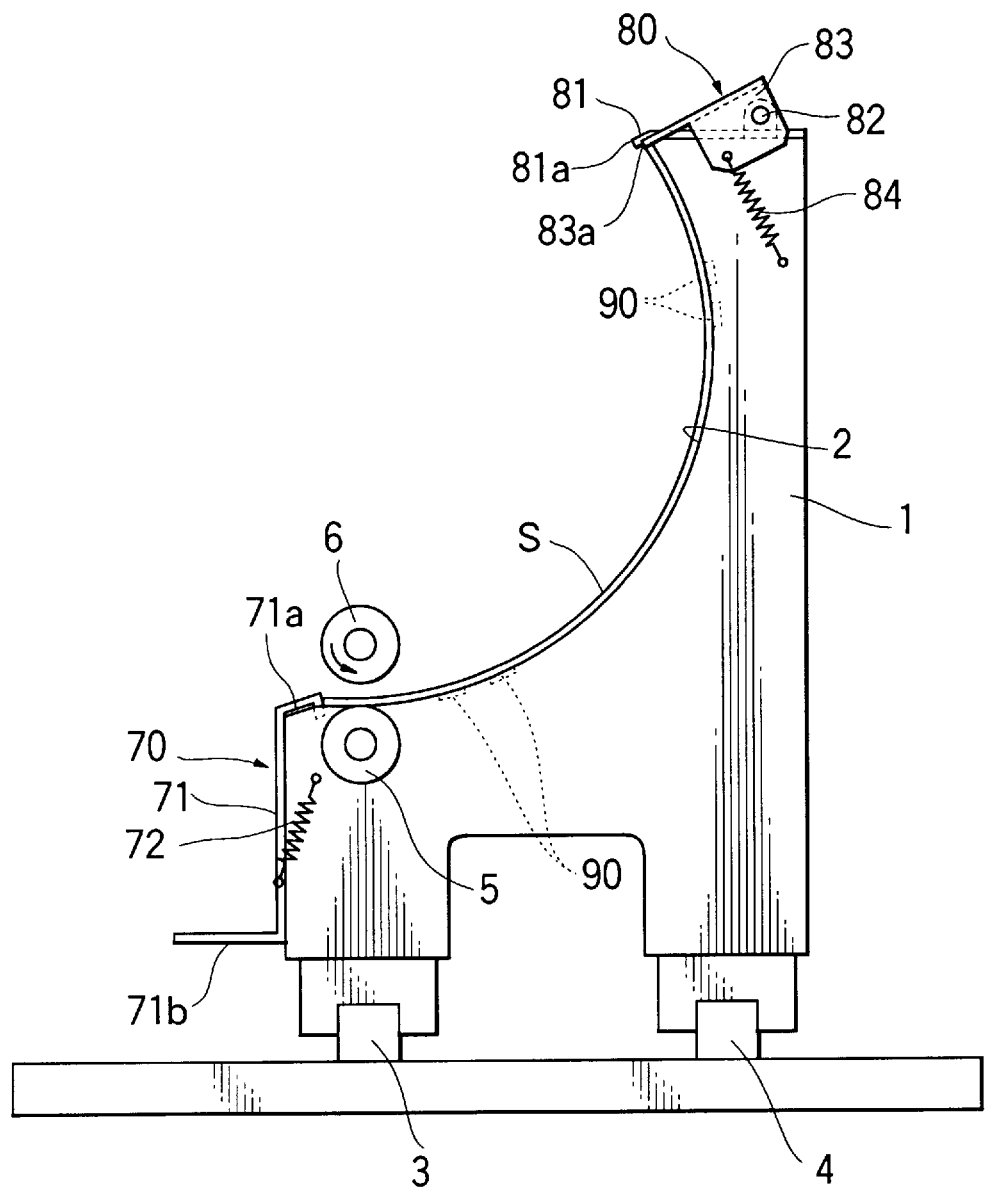
FIG. 8 is a schematic side view showing a sheet holding means with a stimulable phosphor sheet set on an arcuate support surface of the sheet holding means of a scanning device which is an embodiment of the present invention.

FIGS. 6 to 8 are schematic side views showing a method for loading the stimulable phosphor sheet S on the arcuate support surface 2 of the sheet holding means 1.

As shown in FIGS. 6 to 8, sheet rear end portion holding means 70 are provided at the lower end portion of the arcuate support surface 2 of the sheet holding means 1 for abutting against the rear end portion of the stimulable phosphor sheet S loaded onto the arcuate support surface 2 and holding the rear end portion of the stimulable phosphor sheet S loaded onto the arcuate support surface 2 at a predetermined position and sheet leading end portion holding means 80 are provided at the upper end portion of the arcuate support surface 2 of the sheet holding means 1 for abutting against the leading end portion of the stimulable phosphor sheet S loaded onto the arcuate support surface 2 and holding the leading end portion of the stimulable phosphor sheet S loaded onto the arcuate support surface 2 at a predetermined position.

Each of the sheet rear end portion holding means 70 is provided with a substantially reverse Z shaped holding member 71. The holding member 71 can be reciprocated vertically between a retracted position shown in FIG. 6 where the upper portion 71a thereof is accommodated in a cut portion formed at the lower end of the arcuate support surface 2 and the top surface of the upper portion 71a is substantially flush with or lower than the arcuate support surface 2 and a projecting position shown in FIGS. 7 and 8 where the upper portion 71a projects above the arcuate support surface 2. When the holding member 71 is located at its projecting position, the upper portion 71a thereof abuts against the rear end portion of the stimulable phosphor sheet S. Therefore, the rear end portion of the stimulable phosphor sheet S loaded at the predetermined position on the arcuate support surface 2 of the sheet holding means 1 is held at a predetermined position by the upper portion 71a of the holding member 71 of the sheet rear end portion holding means 70.

Each of the sheet leading end portion holding means 80 includes a fixed member 81 mounted on the upper portion of the sheet holding means 1 so that the tip end portion 81a thereof projects downwardly from the upper edge portion of the arcuate support surface 2 and a movable member 83 mounted on the sheet holding means 1 so as to be swingable about a shaft 82. The movable member 83 is swingable about the shaft 82 between the lower position shown in FIG. 6 where it is accommodated in a cut portion formed at the upper end portion of the arcuate support surface 2 and the tip end portion 83a thereof projects from the arcuate support surface 2 and the upper position shown in FIGS. 7 and 8 where the tip end portion thereof is located at the upper edge portion of the arcuate support surface 2. Further, the sheet leading end portion holding means 80 includes a bias spring 84 for biasing the movable member 83 toward its lower position.

A plurality of the sheet rear end portion holding means 70 and a plurality of the sheet leading end portion holding means 80 are respectively provided along the lower edge portion and the upper edge portion of the arcuate support surface 2.

In the thus constituted scanning device which is an embodiment of the present invention, the stimulable phosphor sheet S is loaded and held at a predetermined position on the arcuate support surface 2 of the sheet holding means 1 in the following manner.

As shown in FIG. 6, each of the holding members 71 of the sheet rear end portion holding means 70 is located at the retracted position when the stimulable phosphor sheet S is fed to a predetermined position on the arcuate support surface 2 by the drive rollers 6 located at their transport positions and the driven rollers 5. As indicated by an arrow A in FIG. 6, the holding member 71 is moved to its retracted position by lowering the lower portion 71b of the holding member 71 against the force of a bias spring 72 by an actuating mechanism (not shown). As described above, since the top surface of the upper portion 71a of the holding member 71 is substantially flush with or lower than the arcuate support surface 2 when the holding member 71 is located at its retracted position, the holding member 71 does not interfere with the stimulable phosphor sheet S being loaded onto the arcuate support surface 2 along the direction indicated by an arrow B by the drive rollers 6.

When the leading end portion of the stimulable phosphor sheet S to be loaded onto the arcuate support surface 2 is brought into abutment against the tip end portion 83a of the movable member 83 of each sheet leading end portion holding means 80 by the drive rollers 6, as shown in FIG. 7, the leading end portion of the stimulable phosphor sheet S causes each of the movable members 83 to swing about the shaft 82 against the force of the bias spring 84 until the leading end portion of the stimulable phosphor sheet S comes into abutment against the tip end portion 81a of each fixed member 81.

When the leading end portion of the stimulable phosphor sheet S comes into abutment against the tip end portion 81a of each fixed member 81, the drive rollers 6 are stopped and the actuating mechanism (not shown), which has lowered the lower end portion 71b of each holding member 71 against the force of the bias spring 72 in the direction indicated by the arrow A in FIG. 6 and held the holding member 71 at its retracted position is then stopped. As a result, as shown in FIG. 7, each of the holding members 71 is returned to its projecting position by the force of the bias spring 72.

The drive rollers 6 and the drive rollers 53 are then moved to their retracted positions and the stimulable phosphor sheet S is no longer held between the drive rollers 6 and the driven rollers 5. As a result, the stimulable phosphor sheet S is pushed toward the sheet rear end portion holding means 70 along the arcuate support surface 2 by the force of each bias spring 84 for biasing the movable member to its lower position and as shown in FIG. 8, the leading end portion and the rear end portion thereof come into abutment against the tip end portion 83a of each movable member 83 and the upper end portion 71a of each holding member 71 so that the stimulable phosphor sheet S is held between the tip end portion 83a of each movable member 83 and the upper end portion 71a of each holding member 71 in alignment with the arcuate support surface 2 of the sheet holding means 1 and held at a predetermined position on the arcuate support surface 2 of the sheet holding means 1.

The distance measured along the arcuate support surface 2 between the upper portion 71a of the holding member 71 of each sheet rear end portion holding means 70 located at its projecting position and the tip end portion 83a of the movable member 83 of each sheet leading end portion holding means 80 located at its lower position is determined to be substantially equal to or slightly shorter than the length of the stimulable phosphor sheet S to be loaded onto the arcuate support surface 2 measured along the arcuate support surface 2 so that the stimulable phosphor sheet S can be held between the upper portion 71a of the holding member 71 of each sheet rear end portion holding means 70 and the tip end portion 83a of the movable member 83 of each sheet leading end portion holding means 80.

As described above, since the magnetic layer is formed on the back surface of the stimulable phosphor sheet S and the plurality of magnets are embedded in a zigzag pattern in the arcuate support surface 2 in the vicinity of the upper end portion and the lower end portion of the arcuate support surface 2 of the sheet holding means 1 along the axis of the arcuate support surface 2, the stimulable phosphor sheet S loaded at a predetermined position on the arcuate support surface 2 of the sheet holding means 1 in this manner is held in close contact with the arcuate support surface 2 of the sheet holding means 1. Therefore, it is possible to scan the stimulable phosphor layer of the stimulable phosphor sheet S with the laser beam 8 and read locational information regarding the radioactively labeled substance stored and recorded in the stimulable phosphor layer by photoelectrically detecting the stimulated emission released from the stimulable phosphor contained in the stimulable phosphor layer.

According to the above described embodiment, the sheet rear end portion holding means 70 are provided for supporting the rear end portion of the stimulable phosphor sheet S loaded onto the arcuate support surface 2 at the lower end portion of the arcuate support surface 2 of the sheet holding means 1 and the sheet leading end portion holding means 80 are provided for supporting the leading end portion of the stimulable phosphor sheet S and pressing the stimulable phosphor sheet S toward the sheet rear end portion holding means 70 along the arcuate support surface 2 at the upper end portion of the arcuate support surface 2 of the sheet holding means 1. Therefore, the leading end portion and the rear end portion of the stimulable phosphor sheet S respectively abut against the tip end portions 83a of the movable members 83 and the upper portions 71a of the holding members 71 and the leading end portion of the stimulable phosphor sheet S is pressed by the tip end portions 83a of the movable members 83 toward the upper portions 71a of the holding members 71 so that the stimulable phosphor sheet S is held between the tip end portions 83a of the movable members 83 and the upper portions 71a of the holding members 71 in alignment with the arcuate support surface 2 and is held at a predetermined position on the arcuate support surface 2 of the sheet holding means 1. Further, since the magnetic layer is formed on the back surface of the stimulable phosphor sheet S and the plurality of magnets are embedded in a zigzag pattern in the arcuate support surface 2 in the vicinity of the upper end portion and the lower end portion of the arcuate support surface 2 of the sheet holding means 1 along the axis of the arcuate support surface 2, it is possible to reliably make the leading end portion and the rear end portion of the stimulable phosphor sheet S, which tend to peel off the arcuate support surface 2 of the sheet holding means 1 after being loaded, come into close contact with the arcuate support surface 2 and the stimulable phosphor sheet S loaded at a predetermined position on the arcuate support surface 2 of the sheet holding means 1 can be kept in close contact with the arcuate support surface 2 of the sheet holding means 1. Therefore, the stimulable phosphor sheet S can be held at a predetermined position on the arcuate support surface 2 of the sheet holding means 1 in a desired manner without using suction means such as a vacuum pump and be scanned with the laser beam 8. Moreover, since the sheet guides 60 each having an L shaped cross section are provided at the opposite side edge portions of the arcuate support surface 2 of the sheet holding means 1, it is possible to reliably guide the stimulable phosphor sheet S to a predetermined position.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although the magnets are provided only in the vicinity of the upper end portion of the arcuate support surface 2 of the sheet holding means 1 and in the vicinity of the lower end portion of the arcuate support surface 2 of the sheet holding means 1, in addition to these magnets, magnets may be provided at other positions such as the central region of the arcuate support surface 2.

Further, in the above described embodiment, the sheet rear end portion holding means 70 are provided for abutting against the one end portion of the stimulable phosphor sheet S and holding it at a predetermined position at the lower end portion of the arcuate support surface 2 of the sheet holding means 1 and the sheet leading end portion holding means 80 are provided for abutting against the other end portion of the stimulable phosphor sheet S and pressing the stimulable phosphor sheet S toward the sheet rear end portion holding means 70 at the upper end portion of the arcuate support surface 2. However, it is possible to provide sheet end portion holding means for abutting against one end portion of the stimulable phosphor sheet S and holding it at a predetermined position at the upper end portion of the arcuate support surface 2 of the sheet holding means 1 and sheet pressing means for abutting against the other end portion of the stimulable phosphor sheet S and pressing the stimulable phosphor sheet S toward the sheet end portion holding means at the upper end portion of the arcuate support surface 2.

Furthermore, in the above described embodiment, the surface of the stimulable phosphor sheet S having the stimulable phosphor layer storing and recording locational information regarding the radioactively labeled substance in the form of radiation energy is scanned with the laser beam 8 and an image is read by receiving and photoelectrically detecting stimulated emission released from the stimulable phosphor layer by the photomultiplier 20. However, the present invention is not limited to such an autoradiographic detecting method for reading locational information regarding the radioactively labeled substance as an image but can be also applied to the case where the stimulable phosphor sheet S provided with the stimulable phosphor layer containing the stimulable phosphor is recorded with images of light, radiation or an electron beam in the form of energy thereof and is scanned with an electromagnetic wave to excite the stimulable phosphor and the stimulated emission released from the stimulable phosphor is photoelectrically read in the chemiluminescent detecting method, the radiographic diffraction image detecting method, the detecting method using an electron microscope or the like. Further, the present invention can be applied not only to the case of detecting stimulated emission released from a stimulable phosphor sheet but also to the case where a sheet carrying image information and formed on the back surface with a magnetic layer is scanned with light and light reflected by the sheet is led to a photomultiplier 20 to read an image.

According to the present invention, it is possible to provide a scanning device which can hold a sheet to be scanned in close contact with a predetermined position of the arcuate support surface of a sheet holding means with a simple structure.

I claim:

1. A scanning device comprising sheet holding means provided with an arcuate support surface open to the upside and one side for holding a sheet to be scanned on the back surface of which a magnetic layer is formed, a light source for irradiating the sheet to be scanned with light, a spinner including a deflection mirror for deflecting light from the light source toward the sheet to be scanned and a light converging means for converging light deflected by the deflection mirror onto a surface of the sheet to be scanned, a motor for rotating the spinner coaxially with a center axis of the arcuate support surface, a light detector for detecting light from the sheet to be scanned, sub-scanning means for translating the sheet holding means relative to the spinner in parallel with the center axis, magnetic material provided on the arcuate support surface of the sheet holding means, sheet end portion holding means provided at one end portion of the arcuate support surface of the sheet holding means and adapted for abutting against one end portion of the sheet to be scanned to hold the one end portion at a predetermined position, and sheet pressing means provided at the other end portion of the arcuate support surface of the sheet holding means and adapted for abutting against the other end portion of the sheet to be scanned to press the sheet to be scanned along the arcuate support surface toward the sheet end portion holding means.

2. A scanning device in accordance with claim 1 wherein the sheet end portion holding means is provided at a lower end portion of the arcuate support surface of the sheet holding means and the sheet pressing means is provided at an upper end portion of the arcuate support surface of the sheet holding means.

3. A scanning device in accordance with claim 1, wherein the sheet end portion holding means is provided at an upper end portion of the arcuate support surface and the sheet pressing means is provided at a lower end portion of the arcuate support surface.

4. A scanning device in accordance with claim 1, wherein said sheet end portion holding means abuts against one edge of the sheet to be scanned.

5. A scanning device in accordance with claim 1, wherein said sheet end portion holding means abuts against one end portion of the sheet to be scanned while said light source irradiates the sheet to be scanned.

6. A scanning device in accordance with claim 1, further comprising a driven roller and a drive roller mounted on said sheet holding means near a lower end portion of said arcuate surface.

7. A scanning device comprising:

a sheet holding member provided with an arcuate support surface open to the upside and one side to hold a sheet to be scanned, said arcuate support surface having an upper end portion, a lower end portion, and two opposite side portions;

a predetermined scanning area, on said arcuate support surface, defined by a first edge located near said upper end portion and a second edge located near said lower end portion, wherein said predetermined scanning area is the same size as the sheet to be scanned;

a sheet end portion holding member, provided at said lower end portion, adapted to abut against one edge of the sheet to be scanned to hold the sheet in said predetermined scanning area; and a sheet pressing member, provided at said upper end portion, adapted to abut against a second edge of the sheet to be scanned and to press the sheet to be scanned along said arcuate support surface toward said sheet end portion holding member.

8. A scanning device in accordance with claim 7, wherein said sheet end portion holding member is of a reverse Z shape.

9. A scanning device in accordance with claim 7, wherein said sheet end portion holding member is connected to said sheet holding member for reciprocal movement between a retracted position wherein said sheet end portion holding member is below said arcuate support surface, and a projecting position wherein said sheet end portion holding member projects above said arcuate support surface.

10. A scanning device in accordance with claim 9, wherein said sheet end portion holding member is biased to its projecting position.

11. A scanning device in accordance with claim 7, further comprising a driven roller and a drive roller mounted on said sheet holding member near said lower end portion of said arcuate surface.

12. A scanning device in accordance with claim 7, further comprising a cut out in said arcuate support surface to accommodate said sheet end portion holding member, and a cut out in said arcuate support surface to accommodate said sheet pressing member.

13. A scanning device in accordance with claim 7, further comprising a plurality of sheet end portion holding members and a plurality of sheet pressing members.

14. A scanning device in accordance with claim 7, wherein the distance measured along the arcuate support surface between said sheet end portion holding member and said sheet pressing member is substantially equal to the length between said first edge and said second edge of said predetermined scanning area as measured along said arcuate support surface.

15. A scanning device in accordance with claim 7, wherein the distance measured along the arcuate support surface between said sheet end portion holding member and said sheet pressing member is slightly shorter than the length between said first edge and said second edge of said predetermined scanning area as measured along said arcuate support surface.

16. A scanning device in accordance with claim 7, further comprising sheet guides connected to said side portions of said arcuate support surface, wherein said sheet guides have an L-shaped cross section.

17. A scanning device in accordance with claim 7, further comprising magnetic material, provided on said arcuate support surface, for causing said sheet to come into intimate contact with said arcuate support surface.

18. A scanning device in accordance with claim 17, wherein said magnetic material is provided in a zigzag pattern parallel with the longitudinal axis of said arcuate support surface.

19. A scanning device in accordance with claim 17, wherein said magnetic material is provided inside said first and said second edges of said predetermined scanning area by a distance corresponding to between 5 and 25% of the length between said first and second edges of said predetermined scanning area as measured along said arcuate support surface.

20. A scanning device in accordance with claim 17, wherein said magnetic material includes an arcuate surface that is flush with said arcuate support surface.

* * * * *

UNITED STATES PATENT AND TRADEMARK OFFICE
CERTIFICATE OF CORRECTION

PATENT NO.: 5,859,441
DATED: January 12, 1999
INVENTOR(S): MURAISHI, KATSUAKI

It is certified that error appears in the above-identified patent and that said Letters Patent is hereby corrected as shown below:

On the title page , Item [30]:

In the Foreign Application Priorty Data, the date has been changed from -- " May 2, 1996 " to -- February 5, 1996--.

Signed and Sealed this

First Day of June, 1999

Attest:

Attesting Officer

Q. TODD DICKINSON

Acting Commissioner of Patents and Trademarks